(12) United States Patent
Guertin, Jr.

(10) Patent No.: US 6,578,876 B2
(45) Date of Patent: Jun. 17, 2003

(54) PLUMBING CONNECTION AND DISCONNECTION SYSTEM AND METHOD

(75) Inventor: Gerard P. Guertin, Jr., Vergennes, VT (US)

(73) Assignee: Good Turns, LLC, Vergennes, VT (US)

(*) Notice: Subject to any disclaimer, the term of this patent is extended or adjusted under 35 U.S.C. 154(b) by 0 days.

(21) Appl. No.: 10/001,277

(22) Filed: Dec. 4, 2001

(65) Prior Publication Data

US 2002/0070547 A1 Jun. 13, 2002

Related U.S. Application Data

(60) Provisional application No. 60/254,770, filed on Dec. 12, 2000.

(51) Int. Cl.$^7$ ............................................. F16L 15/04
(52) U.S. Cl. ................... 285/148.19; 285/333; 285/92; 285/390; 285/93
(58) Field of Search .................... 285/148.19, 148.21, 285/333, 334, 390, 355, 383, FOR 157, 92, 93, 114

(56) References Cited

U.S. PATENT DOCUMENTS

| | | | | |
|---|---|---|---|---|
| 176,796 A | * | 5/1876 | Martin | 285/32 |
| 278,800 A | * | 6/1883 | Kline | 285/148.19 |
| 279,086 A | * | 6/1883 | Emery | 285/331 |
| 349,149 A | * | 9/1886 | Duff | 285/148.19 |
| 581,050 A | * | 4/1897 | Wentz | 285/148.19 |
| 600,988 A | * | 3/1898 | Hayes | 285/330 |
| 1,365,025 A | * | 1/1921 | Elder | 285/32 |
| 1,365,477 A | * | 1/1921 | Gabriel et al. | 292/307 A |
| 1,384,962 A | * | 7/1921 | Kuhne | 285/114 |
| 1,438,751 A | * | 12/1922 | Des Isles | 220/3.3 |
| 1,781,091 A | * | 11/1930 | Wilson | 285/148.19 |
| 2,107,716 A | * | 2/1938 | Singleton | 285/148.19 |
| 2,465,027 A | * | 3/1949 | McManaway | 285/36 |
| 2,702,715 A | * | 2/1955 | Andrews | 285/32 |
| 2,906,152 A | * | 9/1959 | Brase | 81/53.2 |
| 2,926,027 A | * | 2/1960 | Marquis, Jr. | 285/32 |
| 3,468,563 A | * | 9/1969 | Duret | 285/93 |
| 3,476,409 A | * | 11/1969 | Benteler et al. | 285/40 |
| 4,317,585 A | * | 3/1982 | Boice | 285/93 |
| 4,614,120 A | * | 9/1986 | Fradin et al. | 73/761 |
| 4,703,492 A | * | 10/1987 | Sekiguchi et al. | 373/91 |
| 4,927,187 A | * | 5/1990 | Sanford et al. | 285/80 |
| 5,212,885 A | * | 5/1993 | Buonodono et al. | 29/890.14 |
| 5,636,654 A | * | 6/1997 | Helm | 137/15.01 |
| 6,070,912 A | * | 6/2000 | Latham | 285/61 |
| 6,135,509 A | * | 10/2000 | Billington, III | 285/92 |
| 6,209,926 B1 | * | 4/2001 | Mastro | 285/32 |
| 6,363,598 B1 | * | 4/2002 | Staudt et al. | 29/407.1 |

FOREIGN PATENT DOCUMENTS

| | | | | |
|---|---|---|---|---|
| DE | 139631 | * | 1/1990 | 285/FOR 157 |
| DE | 4231084 | * | 3/1994 | 285/FOR 157 |
| WO | 94007072 | * | 3/1994 | 285/FOR 157 |

* cited by examiner

Primary Examiner—Eric K. Nicholson (57) ABSTRACT

An adapter and coupler assembly has two externally threaded adapters, one left-hand threaded and the other right-hand threaded, and an internally threaded coupler, one end left-hand threaded, the other end right-hand threaded. The coupler threadedly engages the two adapters simultaneously, tightening on both by rotating in one direction, providing a fluid-tight seal. Each adapter has the other end barbed for connection to hose. The coupler and the two adapters each have an external annular flange which is perforated to receive seizing wire or wire ties to prevent the components from unthreading. The coupler has a multi-sided barrel at its center, and the adapters have a multi-sided nut portion, to provide purchase by a wrench-type tool. Each component may also have a mark indicating the starting point of the thread, to facilitate engagement of the components. The assembly is especially useful in fluid-carrying systems of boats, recreational vehicles, and campers.

24 Claims, 11 Drawing Sheets

PLUMBING CONNECTION AND DISCONNECTION SYSTEM AND METHOD

This application claims the benefit of Provisional Application No. 60/254,770, filed on Dec. 12, 2000.

TECHNICAL FIELD

The present invention relates, in general, to an adapter and connector assembly system and method for connection and disconnection of plumbing, e.g., water and wastewater systems, and fuel systems, as well as exhaust systems. In particular, the invention relates to a connector system and method which will be especially useful in boats, recreational vehicles (RVs), and campers. For purposes of simplicity, this document will discuss primarily water and wastewater systems, but it should be kept in mind that fuel systems and exhaust systems on such vehicles have the same connection and disconnection needs.

BACKGROUND OF THE INVENTION

Boats, recreational vehicles (RVs), and campers are generally designed with self-contained water and wastewater systems. These vehicles have a need for secure connections among the various components of their fluid management systems. The need is heightened by the constant and sometimes jarring physical forces encountered while such a vehicle is moving. Strong reinforced hoses, which come in many sizes, are often utilized. Connection and disconnection of such hoses is a cumbersome and often painful task, particularly given the new, synthetically fortified hoses that are replacing wire hose and pipe, and the lack of working space available on a boat, RV, or camper. Repair is difficult enough when the boater or camper is near home with easy access to tools and materials, but is even more difficult when traveling in remote areas.

Current state of the art is to use the new expensive hoses reinforced with synthetic or steel wire, with standard household plumbing adapters. These adapters were never designed with disconnection in mind; household connections may never have to be disconnected. However, in a vehicle which is frequently in motion, wear and tear occurs which may necessitate repair or replacement of hoses and components periodically. In addition, the items which are being connected and utilized in vehicles are valves, pumps, macerators and gauges which are not typically used in a house, and which themselves are prone to failure and need repair or replacement. Consequently, the standard barbed adapters (barb fittings) used in houses are not adequate for connection and disconnection of plumbing components in vehicles.

The following issues arise when maintaining plumbing components in a boat, RV or camper:

1. Limited space for hoses, pipes, valves, pumps, holding tanks, through-hulls, etc., in addition to tools, the head and hands of a worker, and movement of the parts and tools;
2. Extreme difficulty of disconnecting steel or synthetic wire reinforced hose which has been connected using standard adapters and hose clamps;
3. Requirement for very secure fit of hoses, pipes and components under conditions of constant and often severe motion;
4. Expense of hoses and components for vehicles and the resultant need to re-use as much as possible; and
5. Lack of access to parts and tools when a boat or vehicle is in remote places.

Prior art is based on existing house or business plumbing to which easy access is generally assured. The few plumbing connector devices available either are not useable with large reinforced hoses, are too large and impossible to connect and disconnect in tight spaces, are not lockable in place, or are otherwise limited in their scope.

On a boat, camper, or RV, the simplicity of the system and the ease of dismantling, repairing, and re-installing the wastewater and water systems are as important as the strength of the system itself. The basic criteria for connections for water and wastewater containment systems in boats, campers and RVs are as follows:

1. Simple and easy to install and uninstall using common tools,
2. Secure under conditions of constant and sometimes severe motion,
3. Manageable in small spaces,
4. Useable with the synthetic hoses and sophisticated devices now found in boats and recreational vehicles,
5. Simply designed with minimal breakable components, and
6. Reasonably priced.

It is, therefore, the primary object of the present invention to provide an adapter and coupler assembly system for use in boats, recreational vehicles and similar situations, that is simple to install and uninstall in small spaces, provides secure connection of components and hoses, and can be locked in place. It is a further object of this invention that the adapter and coupler assembly be simply designed, easy to manufacture and reasonably priced.

Solution to the Problem

A. The Adapter/Coupler Assembly:

The solution is the development of an assembly system consisting of three simple, effective and inexpensive components: two adapters, with a coupler between them. This assembly is easily installed, and facilitates connection and disconnection of any components of water and wastewater systems in boats, RVs, or campers. It is compatible with existing, universally available hose and pipe fitting components. It can be locked in the assembled position to provide safe and secure connections.

This adapter/coupler assembly system (the assembly) is described as follows:

One female coupler with one end right-hand threaded and the other end left-hand threaded (the coupler). (See FIGS. 5a, 5b, 5c)

Figure 6:
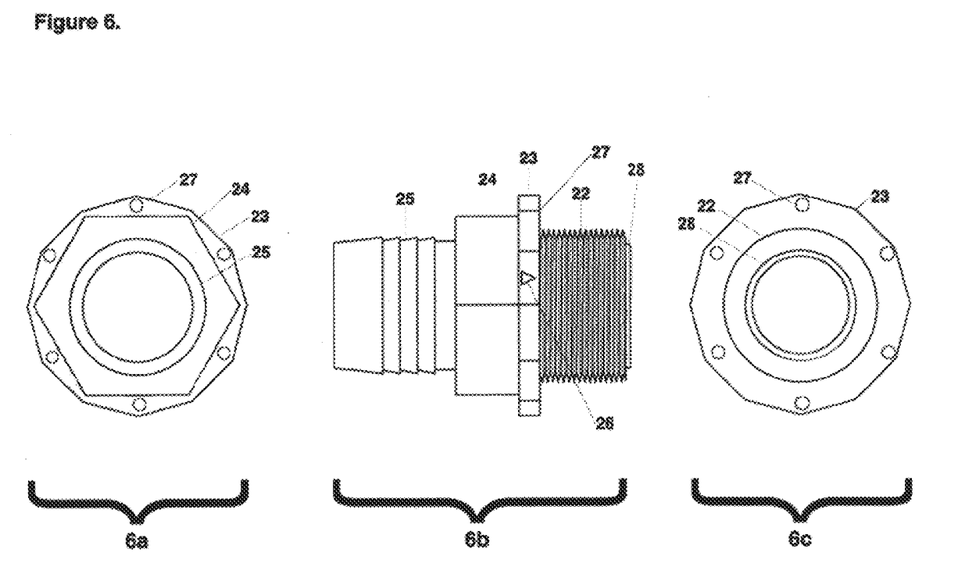
FIG. 6a is a left end view of a right-hand threaded embodiment of an adapter made in accordance with the invention.
FIG. 6b is a side elevation view of a right-hand threaded embodiment of an adapter made in accordance with the invention.
FIG. 6c is a right end view of a right-hand threaded embodiment of an adapter made in accordance with the invention.

One adapter with one male end barbed and the other male end right-hand threaded (the right adapter); (See FIGS. 6a, 6b, 6c)

Figure 7:
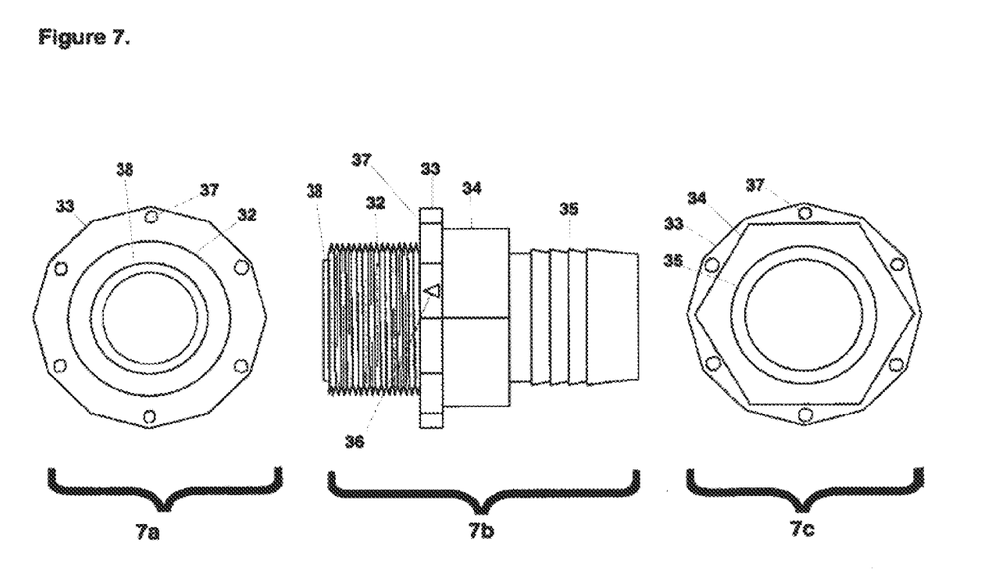
FIG. 7a is a left end view of a left-hand threaded embodiment of an adapter made in accordance with the invention.
FIG. 7b is a side elevation view of a left-hand threaded embodiment of an adapter made in accordance with the invention.
FIG. 7c is a right end view of a left-hand threaded embodiment of an adapter made in accordance with the invention.

One adapter with one male end barbed and the other male end left-hand threaded (the left adapter); (See FIGS. 7a, 7b, 7c)

Figure 8:
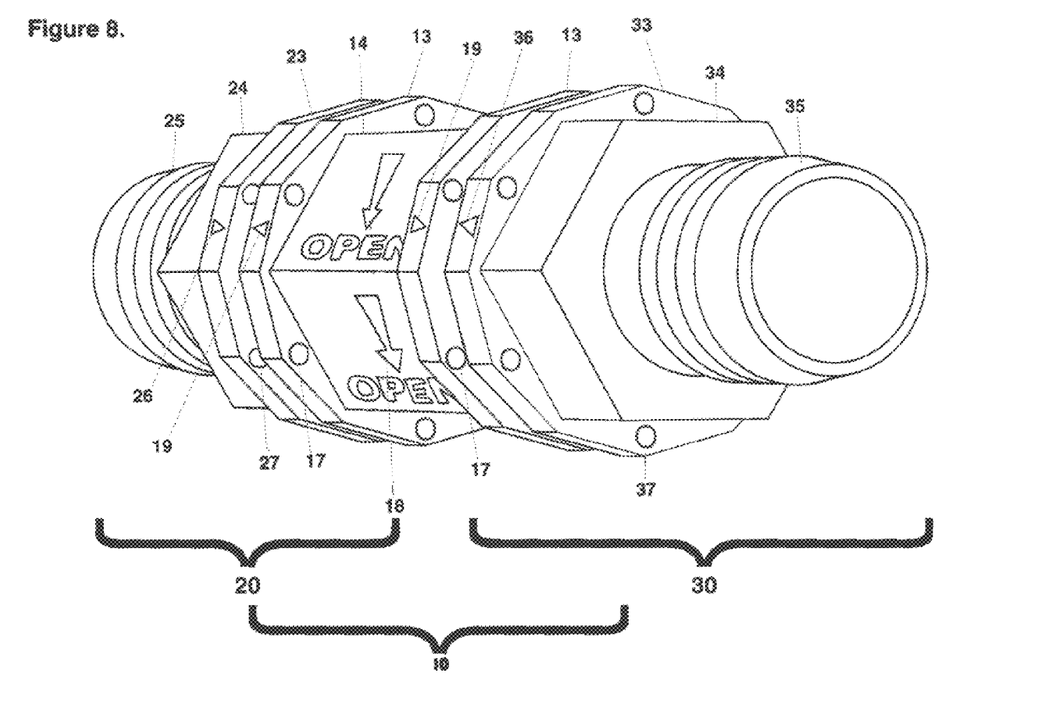
FIG. 8 is a perspective view of the connector and adapters in their assembled configuration, made in accordance with the invention.

The right adapter and the left adapter are joined by means of the coupler (See FIG. 8).

While the term "barbed end" is used here to describe the adapter end opposite the right or left-hand threaded end, that end does not have to be barbed nor does it have to have a specific number or size of barbs, however, for consistency it will be called the barbed end. The barbed end of each adapter is joined to hose using existing methods, i.e. forcing the hose over the barbed end of the adapter and hose-clamping it in place. However, these joints, once made, will not have to be undone because the coupler fills that requirement. The coupler is fitted into place with its left-hand internally threaded end over the externally threaded end of the left adapter and its right-hand internally threaded end over the externally threaded end of the right adapter and then the coupler is rotated axially in the direction appropriate for threadedly engaging the two adapters simultaneously, pulling the adapters together in a tight fit. The adapters are displaced axially towards each other, into the coupler, for a distance equal to the lateral width of the threaded section of each or as far as connection is made. To accomplish disconnection, the coupler is rotated axially in the opposite direction. Arrows indicating direction of rotation are cast into the coupler body.

The adapters may have female left- and right-threaded ends with a corresponding male coupler; however, for consistency, the male adapter and female coupler configuration will be employed throughout this document.

The basic concept revolves around the use of the universal coupler to meet the overall system criteria. Given the limited flexibility of the hoses and the lack of maneuvering room in boats, RVs and campers, getting more than one component to turn is often impossible. Therefore it is necessary to draw together or separate the components or sections of hose using only one moving part. Only the coupler has to turn to release or secure the fixed hoses; the left adapter and right adapter remain stationary except for their slight axial movement together or apart.

Arrows indicating the thread starting point are cast into the coupler and the adapters. A perforated flange on each of the three pieces permits the system components, once connected, to be held in place with seizing wire, wire ties, or similar means. All three pieces of the assembly, that is, the coupler and right and left adapters, are cast with an octagonal nut to allow a wrench to easily fit on them. The nut could be four- or six-sided as well, or shaped otherwise, but eight sides allow good flexibility in wrench positions coupled with adequate purchase for turning. The coupler is only marginally larger in diameter than the adapters. The slim profile and standard pipe fitting dimensions minimize space and spare parts requirements, while maximizing possible options.

The left and right adapters can be configured as straights, elbows, bends, or any of the commonly found configurations available in a basic hardware store. Similarly, T's, Y's, and other multiple fittings can be adapted to this system. The T's and other multiple (more than two) outlet fittings would need to be redesigned to include the same combination of threaded end, perforated flange, and octagonal nut configuration as found on the straight adapters. It is also possible to design the coupler as a step up or step down flow device by simply molding the coupler ends with different internal diameters and using different sized left and right adapters.

One of the primary uses of this assembly is to facilitate the connection and disconnection of a boat's wastewater system to and from the through-hull fitting when entering and exiting U.S. coastal waters. The boat's Y-valve (which allows the choice of holding tank or through-hull for the waste destination) is connected with hose to the adapter-coupler assembly and then to the through-hull fitting. A Y-valve manufactured according to current standards has three barbed arms, one of which connects to the hose leading to the through-hull fitting. Using the assembly approach, the steps and components required would be:

1. A section of hose attached and hose-clamped to the appropriate barbed end of the Y-valve;
2. A section of hose attached and hose-clamped to the through-hull fitting, of sufficient length to reach the hose leading from the Y-valve;
3. A right adapter with the barbed end attached and hose-clamped to the open end of the hose leading from the Y-valve;
4. A left adapter with the barbed end attached and hose-clamped to the open end of the hose leading from the through-hull fitting;
5. A coupler connecting the right adapter in 3 with the left adapter in 4.

B. The System Approach:

The assembly is the key to simple connection and disconnection of components in water and wastewater systems. The coupler adds to the ease and security of installation and maintenance of the system. The adapter/coupler strategy allows for the migration from the existing hose-to-device connection system for boats, RVs and campers, to the easier, more maintenance-friendly assembly one device at a time.

Expanding the use of this assembly into a larger system of interchangeable parts involves manufacturing elbows, Y-couplings, T-couplings, Y-valves, pumps, heads, thru-hull fittings, shutoff valves, holding tanks, filters, and other standard components with male right-hand National Pipe Tapered (NPT) or National Pipe Standard (NPS) threaded arms, instead of barbed arms as they are commonly produced. The assembly components can then connect directly to these devices. Any hose used will not have to be disconnected from barbed adapters because the coupler will fill that requirement.

In the systematic approach, the Y-valve to through-hull connection described at the end of Section A above would be simplified. The barbed arms of the Y-valve would be replaced with male right-hand threaded arms. Using a Y-valve with such threaded arms, the connection to the hose leading to the through-hull fitting could be as follows:

1. A section of hose attached and hose-clamped to the through-hull fitting, of sufficient length to reach the Y-valve;
2. A left adapter with the barbed end attached and hose-clamped to the open end of the hose leading from the through-hull fitting;
3. A coupler connecting the left adapter in 2 with the appropriate right-hand threaded arm of the Y-valve.

The next step in the systematized approach would be to use a right-hand threaded through-hull fitting in addition to the threaded Y-valve. An appropriately sized section of hose would have a left adapter at each end, with the barbed end of each attached and hose-clamped to the hose. The hose would be connected to both the Y-valve and the through-hull fitting using two couplers, which would connect to the right-threaded arm of each device. This arrangement would allow all components to be easily connected and disconnected.

This systematized approach would eliminate multiple hose sections and additional adapters and hose clamps, which would translate into more reliable connections, in many cases fewer connections, smaller space requirements, fewer parts, lower cost, less chance of leaking, no component damage and easier maintenance. This approach allows for a more integrated use of pipe, conduit and hose. Additionally, it is easier and more efficient to cap off both ends of a disconnected system (Y-valve and through-hull) using standard, readily available threaded cap fittings. An added advantage to the system approach is that if the threaded Y-valve failed, a barbed-end Y-valve can be used to replace the threaded one in an emergency by using three right adapters and hose along with couplers and existing left adapters. Furthermore, any removed device can be temporarily replaced with two right adapters and a section of hose.

As part of a larger connection system, manufacturers of pumps, valves, etc. could develop their products with a right-hand NPT or NPS thread instead of the barbed or smooth male outlet common today. In this systematic approach, builders, repairers and owners of boats, RVs or campers need only purchase additional left adapters and couplers to make up this assembly system for installing or replacing water and wastewater system components. A few components, however, come with threaded outlets. Some are female and others are male. Some are NPT and others are NPS threads. Adapters can be designed to convert the ends to right-hand, NPT threads.

The goals of the device and system are to facilitate maintenance and repair, to minimize the need to carry many single-use parts, to increase the options of the owner/repairer in system choices, and to improve the existing water and wastewater systems in an incremental manner according to an individual's space, application and financial ability. The focus is therefore on maintaining a common connector while accommodating parts differences through the modification of adapters. This coupler system would allow for different currently manufactured components (by various manufacturers) to be used with the new couplers and left adapters. For example, the replacement of a wastewater macerator currently requires that the hoses be pried off or cut, and the macerator removed. In the new approach, two left adapters can be inserted into the hoses and clamped. The new macerator would have standard NPT right-hand threaded ends rather than the barbed hose connections. Two of the couplers, one on each end of the macerator, would draw the adapters and the new macerator together for a tight fit, and allow the macerator to be seized to the couplers and adapters. Any future replacement would require simply disconnecting the couplers from the macerator, replacing the macerator, and reconnecting the macerator via the couplers. In addition the disconnected hoses can be capped off easily and simply with an appropriate left or right hand threaded cap.

The key elements of this unique systematic approach are:
1. The coupler and the left and right adapters are the only new parts needed.
2. Basic hose and pipe standards are followed (i.e. hose sizes, thread type, etc.).
3. Connections are easier and more efficient to install and un-install.
4. The components are easily aligned (even when not viewable) and securely lockable.
5. Connections are more easily maintained.
6. There are fewer parts than the non-systematic approach.
7. Components can be connected using the systematic or the non-systematic approach as required.

A special stabilizing tool (the tool), consisting of two open-ended wrenches connected by long bolts, has been designed to assist in stabilizing the left and right adapters while the coupler is being tightened. The main purpose of this tool is to stabilize and lock the adapters by leveraging the tool against an RV panel or boat bulkhead, thereby requiring only one hand to turn the coupler. While the tool is not a necessary component to the assembly, it is designed to facilitate the connection and disconnection process, especially when working under space constraints.

Additionally, the perforations in the flanges allow for the use of a common adjustable, open-faced spanner to facilitate tightening and loosening of the coupler.

In these specifications and in the appended claims, the term "coupler" is used to encompass plumbing-type elements that have left-hand and right-hand threaded opposite ends that can threadedly engage left-hand and right-hand threaded adapters simultaneously. A coupler can be configured as a T, shutoff valve, step-up or step-down device or other appropriate configuration.

The term "adapter" encompasses any plumbing element that has one end left or right-hand threaded and the other end(s) barbed, smooth, or other type designed to accept standard plumbing hose or pipe. Adapters can be elements such as: Y-valves, Y's, T's, pumps, etcetera.

DETAILED DESCRIPTION OF THE PREFERRED EMBODIMENTS

Referring first to FIGS. 1–4, there is shown one embodiment of the present invention which comprises an adapter and coupler assembly (1) (the assembly) composed of a female coupler (10) (the coupler), a right-hand threaded and barbed adapter (20) (the right adapter) and a left-hand threaded and barbed adapter (30) (the left adapter). It will be recognized by those skilled in the art that a barbed (ridged) end may have a single barb for some applications or may have multiple barbs for other applications; and that the barbs may vary in width and depth. The coupler (10) and the left and right adapters (the adapters) (20, 30) can be manufactured of PVC, nylon, Marelon®, metal or any other suitable material, and can be manufactured in varying sizes and thread types. ("Marelon®" is a registered trademark of Fores Manufacturing Corp. of Tustin, Calif. for a glass-filled nylon composition used as an integral component of marine hardware.)

Figure 1:
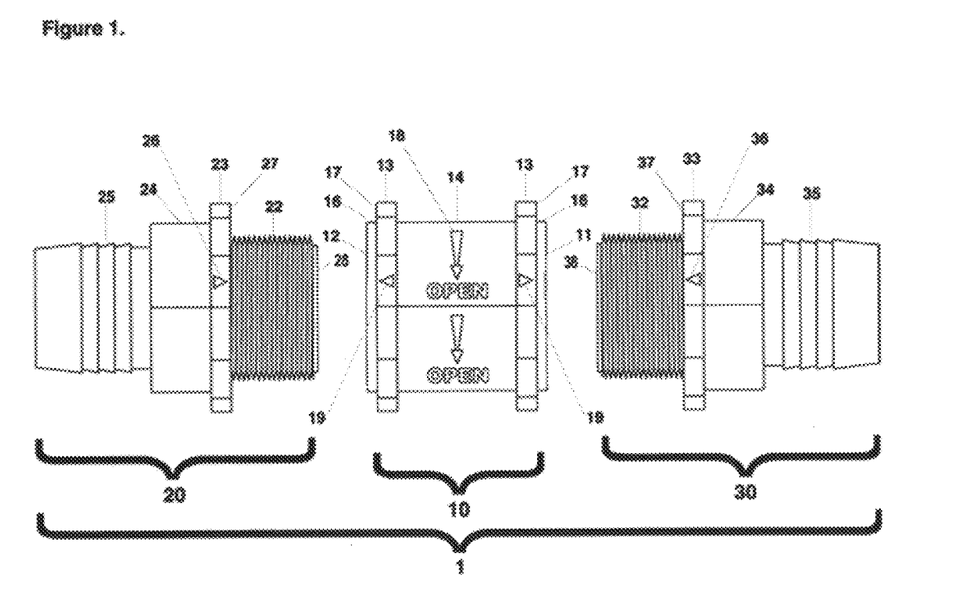
FIG. 1 is an exploded side elevation view illustrating components of an assembly made in accordance with the invention.
Figure 2A:
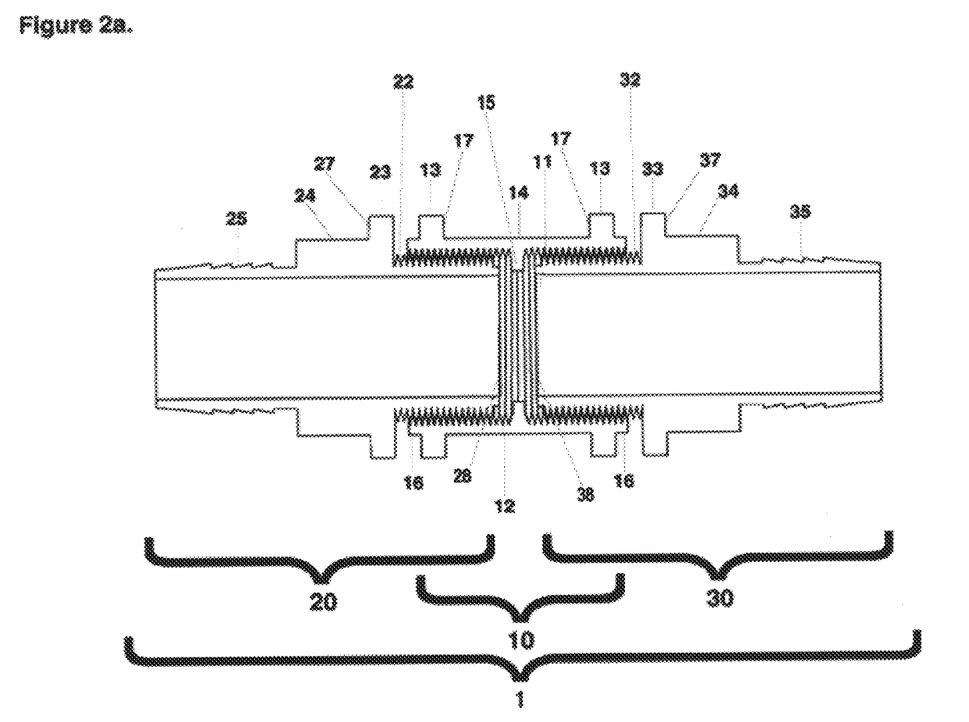
FIG. 2a is a cross-sectional side elevation view of a connector and adapters connected together and using National Pipe Standard (NPS) threads and an internal flange, made in accordance with the invention.
Figure 2B:
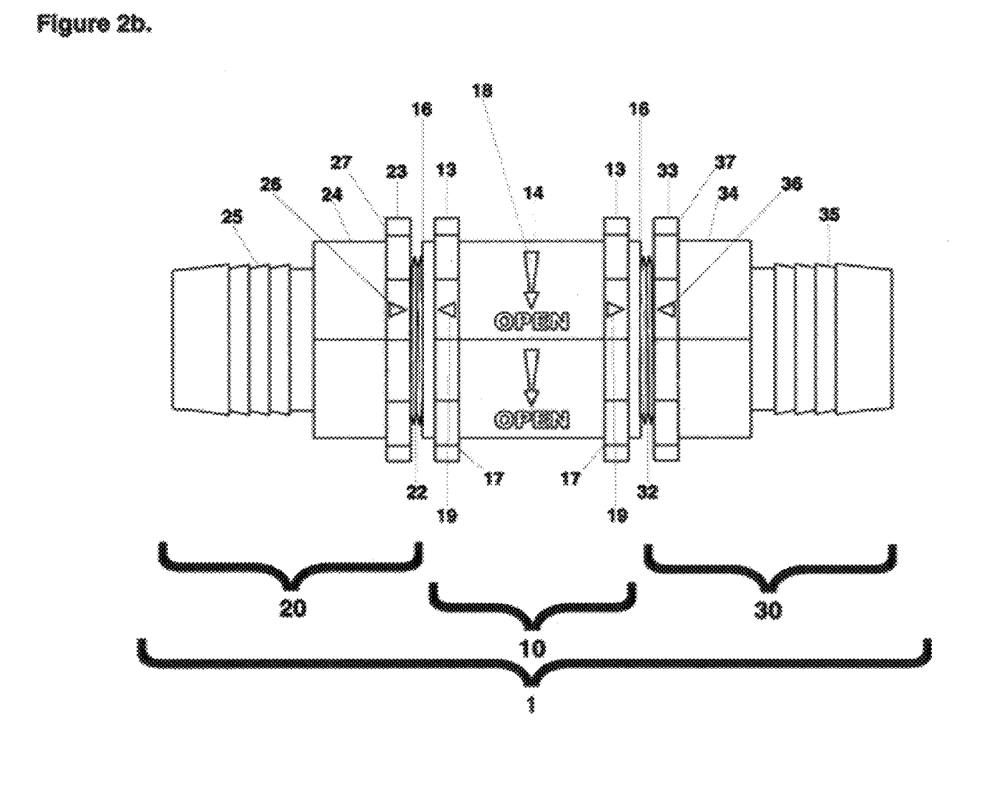
FIG. 2b is a side elevation view of the connector and adapters in their assembled configuration, made in accordance with the invention.
Figure 3:
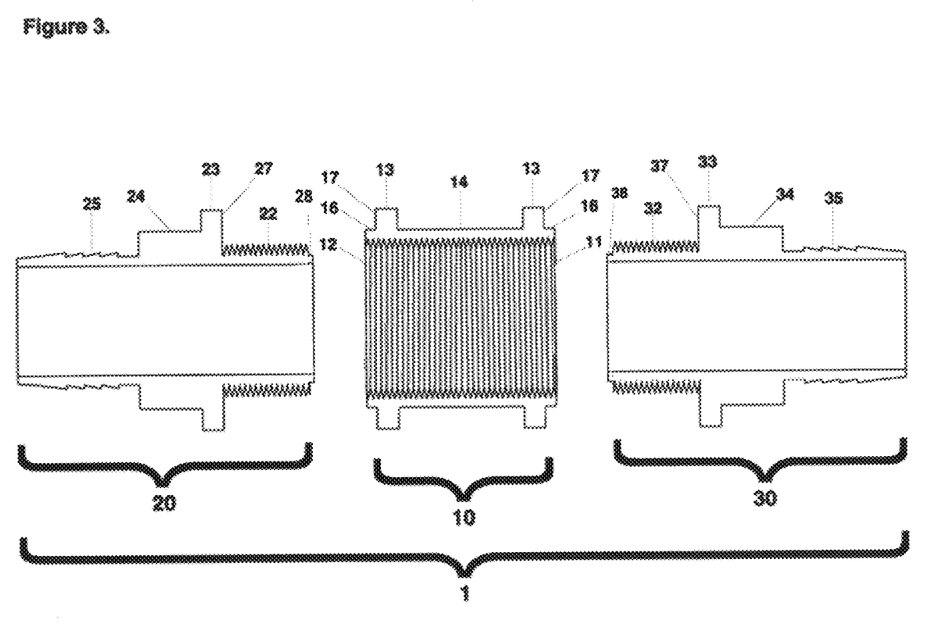
FIG. 3 is an exploded cross-section view of the connector and adapters using National Pipe Tapered (NPT) threads, made in accordance with the invention.
Figure 4:
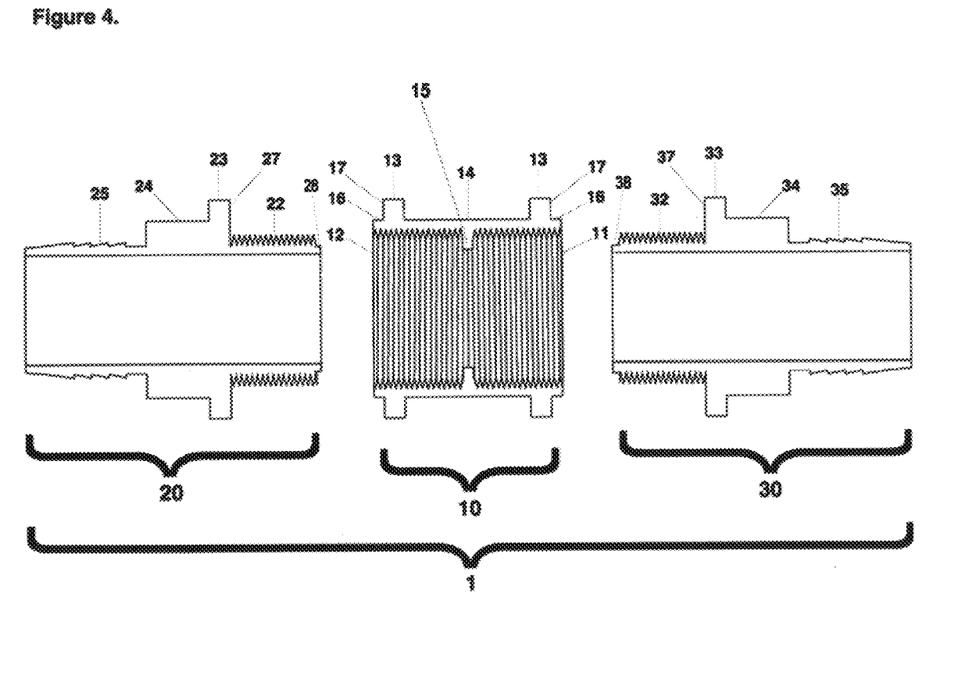
FIG. 4 is an exploded cross-section view of a connector and adapters made in accordance with the invention and using National Pipe Standard (NPS) threads.

The female coupler (10) as shown in FIGS. 1, 2a, 2b, 3, 4, 5a, 5b, 5c, and 8, has a bore which extends longitudinally along its axis for the flow of fluid. One end of the coupler (10) has an internal left-hand threaded end (11), the other end has an internal right-hand threaded end (12). An external annular flange (13) is disposed on either end of the coupler (10), inset longitudinally a short distance by a spacer (16). This flange has multiple perforations (17). These perforations (17) are parallel to the axis of the coupler (10), and are preferably, but not necessarily, round in shape and large enough to accommodate wire ties or seizing wire. The coupler (10) has a hexagonal barrel mid-section (14). A hexagonal or octagonal shape is preferred, but not required, to provide for adequate purchase with a wrench-type tool, and for positioning options for a tool in confined spaces. The coupler (10) may have either NPS (National Pipe Straight) or NPT (National Pipe Tapered) threads (11, 12). The most common thread configuration will be NPT, as the tapered thread is used on most standard hose and pipe connection components. If NPS thread is used, an internal annular flange (15), shown in FIGS. 2a and 4, is molded into the longitudinal center of the coupler (10) and washers should be placed inside the coupler (10), on either side of the internal annular flange (15), to assure a fluid-tight seal with the adapters.

Figure 5:
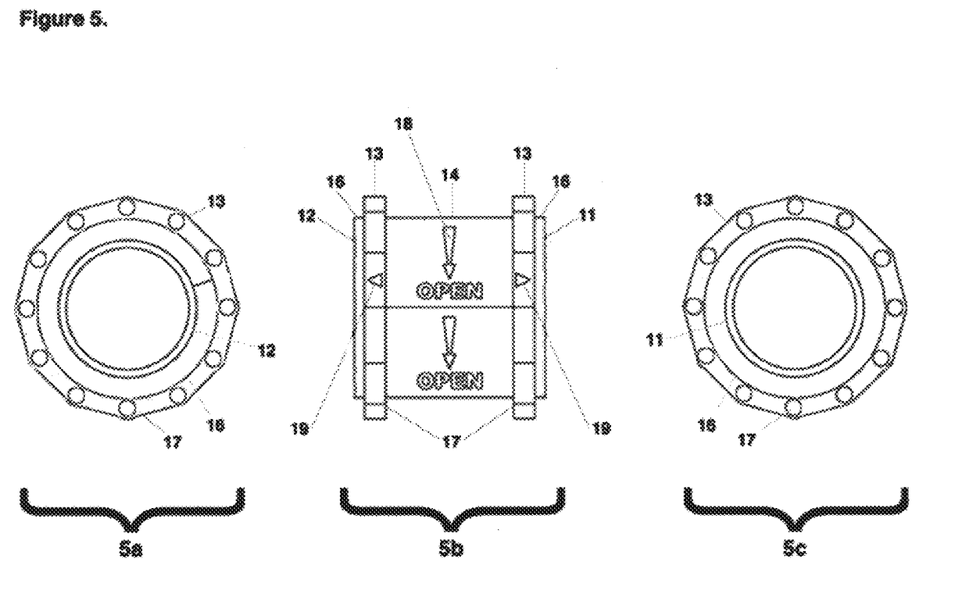
FIG. 5a is a left end view of a connector made in accordance with the invention.
FIG. 5b is a top view of a connector made in accordance with the invention.
FIG. 5c is a right end view of a connector made in accordance with the invention.

A hexagonal or octagonal shape of the central barrel (14) of the coupler (10) is preferred as they allow for good wrench purchase area and wrench positioning. The coupler (10) could be manufactured with any appropriate number of sides, however. The perforated annular flanges (13) are inset by a spacer (16) from the threaded ends (11, 12) in order to allow room to insert a seizing wire or wire tie through the perforations (17). These annular flanges are preferably octagonal but can be any other appropriate shape. Both right-hand and left-hand threads start at the same point on the inner circumference of the coupler (10). This point is marked on the coupler flange (19) and is designed to facilitate threadedly engaging the threaded coupler ends with the threaded adapter ends. The coupler (10) has molded arrows (18) on one or more flat surfaces of the barrel indicating the direction of rotation for loosening the connection.

The right adapter (20) (FIGS. 1, 2a, 2b, 3, 4, 6a, 6b, 6c, 8) and the left adapter (30) (FIGS. 1, 2a, 2b, 3, 4, 7a, 7b, 7c, 8) each have a bore running longitudinally along their axis for the flow of fluid. The right adapter (20) and the left adapter (30) are identical, except that the right adapter has a right-hand external threaded end (22), typically NPT tapered, and the left adapter has a left-hand external threaded end (32), typically NPT tapered. The diameter, thread size, and thread type of the threaded ends (22, 32) of the adapters (20, 30) are appropriately manufactured so that the threaded male ends will threadedly engage the threaded female ends (11, 12) of the coupler (10) closely, in order to make a water-tight fit. The threaded end of each adapter has a slight unthreaded annular extension or pilot (28, 38), to facilitate positioning the male end of the adapter in the appropriate female end of the coupler. The left and right adapters (20, 30) each have the thread starting point clearly marked (26, 36). Each adapter (20, 30) has an external annular flange (23, 33) disposed adjacent to the threads. These flanges (23, 33) are preferably octagonal but can be any other appropriate shape. The flanges are perforated (27, 37), with the perforations running parallel to the axis of the adapter. These perforations (27, 37) are preferably, but not necessarily, round in shape and large enough to accommodate wire ties or seizing wire. Each adapter has a molded external hexagonal nut (24, 34) adjacent to the perforated annular flange (23, 33). A hexagonal or octagonal nut (24, 34) shape is preferred but not required. Note that provision should be made for adequate purchase with a wrench-type tool, and for positioning options for a tool in confined spaces. The opposite end (from the threaded end) of each adapter is a barbed end (25, 35), adjacent to the hexagonal nut (24, 34), for connecting the adapter (20, 30) to a hose by inserting the barbed end into the open end of the hose and using a device such as a hose clamp.

Installation of the assembly (1) is done with common tools and materials. The barbed ends (25, 35) of the right adapter (20) and the left adapter (30) are inserted into the ends of two sections of hose which are to be connected, and held in place (e.g., locked in place with hose clamps). The coupler (10) is fitted into place with its left-hand internally threaded end (11) over the externally threaded end of the left adapter (32) and its right-hand internally threaded end (12) over the externally threaded end of the right adapter (22), aligning the thread starting arrows (19, 26, 36) that define the beginning of the internal threads of the coupler (10) and the external threads (22, 32) of the adapters (20, 30). The coupler (10) is then rotated in the direction appropriate for threadedly engaging the two adapters (20, 30) simultaneously. This will displace the two adapters (20, 30) axially toward the center of the coupler (10). Allowance should be made in the installation to accommodate this displacement. The adapters (20, 30) and coupler (10) can be seized in place using either seizing wire or wire ties through perforations (17, 27, 37) in the annular flanges (13, 23, 33). To disconnect the assembly (1), the coupler (10) is rotated in the opposite direction to that of connection, in the direction indicated by the directional arrows (18), releasing the adapters (20, 30).

It is possible to substitute a standard right- or left-hand threaded connector, threaded arm of a device, threaded pipe or conduit, or other similar member, for either or both of the adapters in this assembly, without altering the spirit or intent of this invention. This description is not intended to preclude such substitution.

Figure 9:
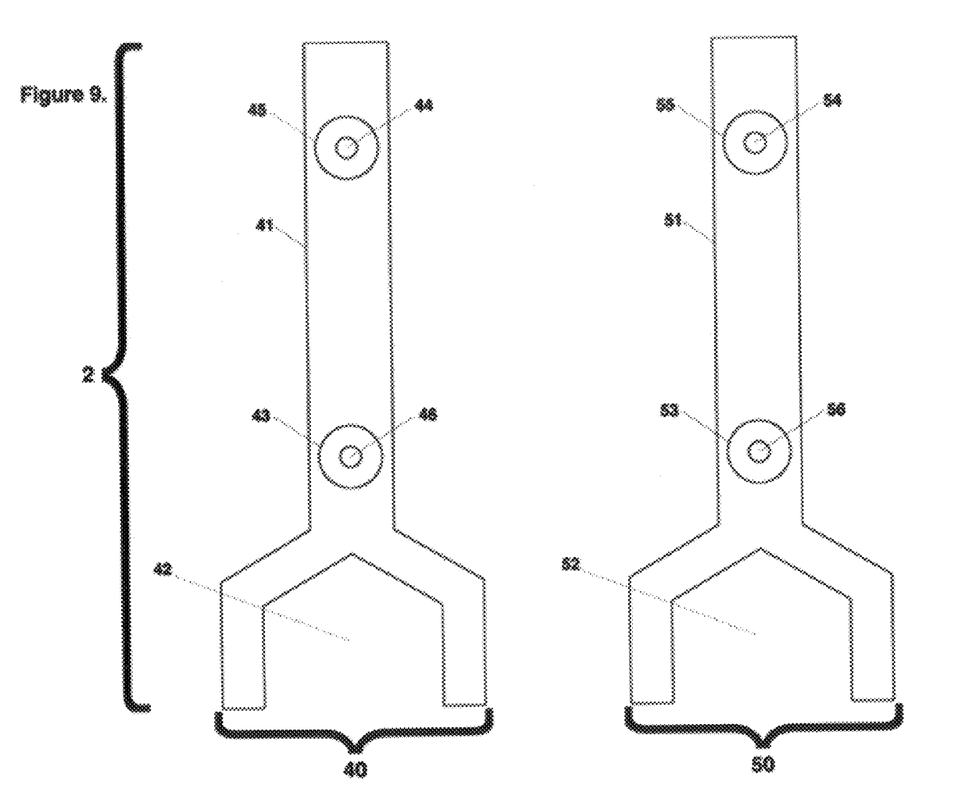
FIG. 9 is a front view of a stabilizing tool made in accordance with the invention.
Figure 10:
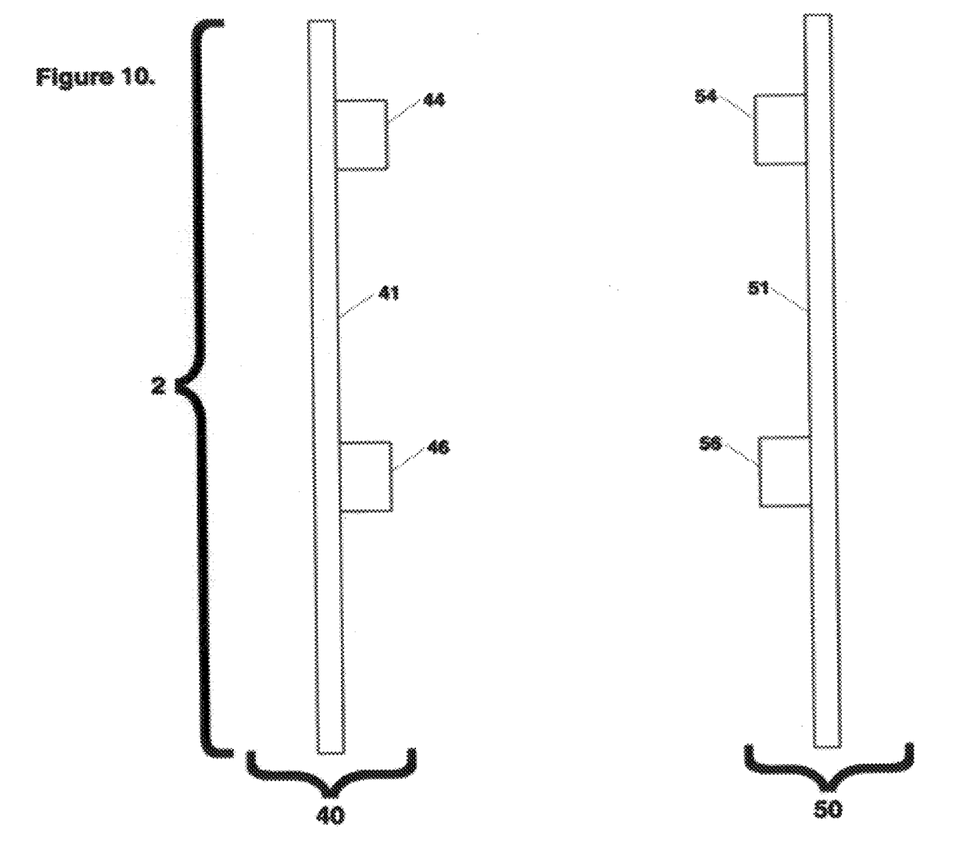
FIG. 10 is a side view of the stabilizing tool made in accordance with the invention.

Referring to FIGS. 9 and 10, there is shown the preferred embodiment of the components of the optional tool (2) (the tool), which consists of two identical open-end wrench tools (40, 50) of the appropriate dimension and shape that the wrench end (42, 52) fits snugly around the nut (24, 34) on the adapters (20, 30). The wrenches (40, 50) can be manufactured from PVC, Marelon®, white metal, brass, or other appropriate material. The holes (44, 54, 46, 56) of suitable diameter in the handle (41, 51) of each wrench are each encircled by a raised collar (43, 53, 45, 55) of appropriate thickness to stabilize a bolt inserted into the hole. The collars (43, 53, 45, 55) extend perpendicularly away from the handle along the axis of the hole. These collars (43, 53, 45, 55) are present on only one side of each wrench handle. The first hole (46, 56) is laterally centered in the handle near the base of the wrench head and just outside the distance of the widest point on the perforated flange (23, 33) of the adapter when the wrench is in place. The second hole (44, 54) is laterally centered in the handle near the end that is away from the wrench head.

Wrench tools (40, 50) are placed on the adapter nuts (24, 34) with the handles in as close a common plane as possible, and with the handles positioned so that the sides with the hole collars face toward each other. Two standard bolts, of suitable diameter for holes (44, 54, 46, 56) and of appropriate length, are inserted into the holes (44 and 46 or 54 and 56) of one wrench (40 or 50) from the side away from the other wrench, and then inserted through the holes (44 and 46 or 54 and 56) of the other wrench (40 or 50) so as to connect the two. The bolts are tightened with nuts such that the wrenches (40, 50) are lightly pressing against the outside of the adapter flanges (23, 33). The tool can then be braced against a solid support such as a board, bulkhead or wall to provide purchase for tightening or loosening the coupler (10) on the adapters (20, 30). The nuts on the bolts will have to be adjusted as the adapters (20, 30) are laterally displaced along the coupler. Undue stress on the tools should not be required to connect or disconnect the coupler (10).

The size and shape of the wrench head will vary with the size and shape of each assembly, and the size of the handle can vary, while accommodating the need for torque strength and the constraints of small spaces. This tool (2) is not a required component of the assembly; it is a suggested option. The assembly can be installed with ordinary tools such as the common open-faced spanner.

INDUSTRIAL APPLICABILITY

The adapter and coupler assembly is especially useful in water and wastewater systems of boats, recreational vehicles, and campers, or any situation where plumbing connections must be made in small spaces. A repair kit, consisting of the adapter and coupler assembly parts and a tool or pair of tools adapted for their assembly is also useful in repairs for such applications.

Although this invention is disclosed and described in the presently preferred embodiments, its uses may extend beyond these specifically described embodiments and it is not intended that the invention be limited to the described embodiments. Those familiar with this and similar applications will realize that modifications can be made while remaining within the scope and spirit of the invention. Thus it is intended that the appended claims cover all equivalent variations as may be subsequently contemplated.

I claim:

1. An adapter and coupler assembly for connecting plumbing components, said assembly comprising:
    a) a coupler, said coupler having first and second ends and a bore extending and communicating between said first and second ends, said bore having right-hand interior threads at said first end and having left-hand interior threads at said second end, said coupler also having external annular flange having perforations disposed close to said first and second ends, said flanges and perforations being adapted to allow seizing together of the assembly components once connected;
    b) a first adapter having a first end comprising right-hand exterior threads for engaging said right-hand interior threads of said coupler, an external perforated annular flange adjacent to said right-hand treads, said flange and perforations being adapted to allow seizing of the assembly components once connected; and a second end barbed, treaded or smooth; and
    c) a second adapter having a first end comprising left-hand exterior threads for engaging said left-hand interior treads of said coupler; an external perforated annular flange adjacent to said left-hand treads, said flange and perforations adapted to allow seizing of the assembly components once connected; and a second end barbed, treaded or smooth.

2. An adapter and coupler assembly for connecting components of marine and land vehicle water, wastewater, and other plumbing systems, comprising:
    a) a coupler having:
        i) a bore extending longitudinally along its axis for the flow of fluid;
        ii) a barrel in the longitudinal center, said barrel having a shape adapted to provide purchase for a wrench-type tool;
        iii) an external annular flange having perforations near each end of the barrel, said flange and perforations being adapted to allow seizing of the assembly components once connected;
        iv) a spacer at each end of the coupler, adjacent to the perforated flanges, adapted to provide room to manipulate seizing wire or wire ties;
        v) internal right-hand threads at the first end;
        vi) internal left-hand threads at the second end;
        vii) directional arrows cast or molded into the barrel, indicating direction of rotation for loosening the connection with said adapters; and
        viii) positional arrows cast or molded into the flanges, indicating the position of the beginning of the threads on the internally threaded ends of the coupler, said thread beginnings being positioned at matching points on the interior circumference of the coupler's respective ends;
    b) a first adapter having right hand exterior threads at one end; and
    c) a second adapter having left-hand exterior threads at one end.

3. A plumbing repair kit comprising in an unassembled combination:
    the coupler, first adapter, and second adapter of the assembly as recited in claim 2.

4. A plumbing repair kit as recited in claim 3, said repair kit further comprising:
    a pair of tools adapted to cooperate in assembling and disassembling said coupler, first adapter, and second adapter together into an assembly.

5. An adapter and coupler assembly as recited in claim 2, wherein said first adapter has
    i) a bore extending longitudinally along its axis, for the flow of fluid;
    ii) said right-hand exterior threads having a diameter, thread size, and type adapted to be compatible for threadedly engaging with the right-hand internally threaded end of said coupler;
    iii) said one end having a slight unthreaded extension or pilot, said extension being adapted to facilitate the positioning of the threaded end of said adapter into the internally threaded end of said coupler;
    iv) an external annular flange having perforations adjacent to the treaded portion, said flange and perforations being adapted to allow seizing of the assembly components once connected;
    v) a multi-sided nut segment said segment being adapted to provide purchase for a wrench-type tool;

vi) a second end, barbed for connecting with a hose; and vii) a positional arrow cast or molded into said annular flange, indicating the position of the beginning of the threads on the eternally threaded end of said first adapter.

6. An adapter and coupler assembly as recited in claim 2, wherein said second adapter has
   i) a bore extending longitudinally along its axis, for the flow of fluid;
   ii) said left-hand exterior threads of a diameter and thread size and type as to be compatible in threadedly engaging with the left-hand internally threaded end of said coupler;
   iii) said one end having a slight unthreaded extension or pilot said extension being adapted to facilitate the positioning of the treaded end of said adapter into the internally threaded end of said coupler;
   iv) an external annular flange having perforations adjacent to the threaded portion, said flange and perforations being adapted to allow seizing of the assembly components once connected;
   v) a multi-sided nut segment said segment being adapted to provide purchase for a wrench-type tool;
   vi) a second end, barbed for connecting with a hose; and
   vii) a positional arrow cast or molded into said annular flange, indicating the position of the beginning of the threads on the externally threaded end of said second adapter.

7. An adapter and coupler assembly as recited in claim 2, said interior threads and said exterior threads of said assembly having a predetermined thread type.

8. An adapter and coupler assembly as recited in claim 7, said predetermined tread type being selected from the list consisting of metric threads, National Pipe Straight (NPS) threads, National Pipe Tapered (NPT) threads, and other tread types used in the art of plumbing fittings.

9. An adapter and coupler assembly as recited in claim 8, further comprising an internal annular flange disposed in the longitudinal center of said coupler, whereby said flange provides a fluid-tight seal with the threaded end of each connecting threaded adapter.

10. An adapter and coupler assembly as recited in claim 2, wherein said perforated annular flanges on the coupler and adapters are multi-sided in shape, to allow space for perforations.

11. An adapter and coupler assembly as recited in claim 2, wherein said perforations in said perforated annular flanges have a round shape for receiving seizing wire or wire ties, or a common adjustable open-faced spanner.

12. An adapter as recited in claim 5, wherein said second end comprises one of the following types: threaded, or smooth.

13. An adapter as recited in claim 6, wherein said second end comprises one of the following types: threaded, or smooth.

14. A coupler and adapter assembly system for connecting plumbing components, comprising:
   a) a coupler having
      i) a bore extending longitudinally therethrough, for the flow of fluid;
      ii) a barrel, said barrel having a shape adapted to provide purchase for turning;
      iii) interior right-hand threads at the first end;
      iv) interior left-hand threads at the second end;
      v) positional indicators cast or molded near each end, indicating the position of the beginning of the internal left-hand and right-hand threads respectively, said threads having their beginning points at matching positions on the internal circumference of the ends of said coupler;
      vi) directional indicators on the coupler barrel indicating the direction of rotation for disconnecting the coupler from the adapters;
   b) a first adapter baking
      i) a bore extending longitudinally therethrough for the flow of fluid;
      ii) exterior right-hand threads at one end, said threads being adapted to threadedly engage with said right-hand interior threads of said coupler;
      iii) an alignment indicator cast or molded near said threaded end, indicating the position of the beginning of said threads;
      iv) a second end barbed, threaded or smooth; and
   c) a second adapter having
      i) a bore extending longitudinally therethrough, for the flow of fluid;
      ii) exterior left-hand threads at one end, said threads being adapted to threadedly engage with said left-hand interior threads of said coupler;
      iii) an alignment indicator cast or molded near said threaded end, indicating the position of the beginning of said threads;
      iv) a second end barbed, threaded or smooth.

15. An adapter and coupler assembly for connecting components of marine and land vehicle water, wastewater, and other plumbing systems, comprising:
   a) a coupler having right-hand interior threads at one end and left-hand interior threads at the other end, said coupler having:
      i) a bore extending longitudinally along its axis for the flow of fluid;
      ii) a barrel in the longitudinal center, said barrel having a shape adapted to provide purchase for a wrench-type tool;
      iii) an external annular flange having perforations near each end of said barrel, said flange and perforations being adapted to allow seizing of the assembly components once connected;
      iv) a spacer at each end of the coupler, adjacent to said perforated flanges, adapted to provide room to manipulate seizing wire or wire ties;
      v) directional arrows cast or molded into said barrel, indicating direction of rotation for loosening the connection with said adapters; and
      vi) positional arrows cast or molded into said flanges, indicating the position of the beginning of the threads on the internally threaded ends of the coupler, said threads having their beginning points at matching positions on the internal circumference of the ends of said coupler;
   b) a first adapter having right-hand exterior threads at one end, said first adapter having:
      i) a bore extending longitudinally along its axis, for the flow of fluid;
      ii) a first end having right-hand exterior threads, said threads having a diameter, thread size, and type adapted to be compatible for threadedly engaging with the right-hand internally threaded end of said coupler;
      iii) said first end having a slight unthreaded extension, or pilot, said extension being adapted to assist positioning of said threaded end in the right-hand interior threaded end of the coupler;

iv) an external annular flange having perforations adjacent to the threaded portion, said flange and perforations being adapted to allow seizing of the assembly components once connected;

v) a multi-sided nut segment, said segment being adapted to provide purchase for a wrench-type tool;

vi) a second end, barbed for connecting with a hose; and vii) a positional arrow cast or molded into said flange, indicating the position of the beginning of the threads on the externally threaded end of said first adapter; and c) a second adapter having left-hand exterior threads at one end, said second adapter having:

i) a bore extending longitudinally along its axis for the flow of fluid;

ii) left-hand exterior threads at one end, said threaded end of a diameter and thread size and type as to be compatible in threadedly engaging with the left-hand internally threaded end of said coupler;

iii) said threaded end having a slight unthreaded extension, or pilot, said extension being adapted to assist positioning of said threaded end in the left-hand interior threaded end of the coupler;

iv) an external annular flange having perforations adjacent to the threaded portion, said flange and perforations being adapted to allow seizing of the assembly components once connected;

v) a multi-sided nut segment, said segment being adapted to provide purchase for a wrench-type tool;

vi) a second end, barbed for connecting with a hose; and vii) a positional arrow cast or molded into said flange, indicating the position of the beginning of the threads on the externally threaded end of said second adapter.

16. A coupler as recited in claim 14, having a single external annular flange having perforations, said flange located in the axial center of said barrel, said flange and perforations being adapted to allow seizing of the assembly components once connected, or for purchase by an adjustable open-faced spanner.

17. A coupler for connecting threaded adapters together, said coupler having:

i) a bore extending longitudinally along its axis for the flow of fluid;

ii) a barrel in the longitudinal center, said barrel having a shape adapted to provide purchase for turning;

iii) a annular flange having perforations near each end of said barrel, said flange and perforations being adapted to allow seizing of the coupler with adapters once connected;

iv) a spacer at each end of the coupler, adjacent to said perforated flanges, adapted to provide room to manipulate seizing wire or wire ties;

v) internal right-hand threads at the first end;

vi) internal left-hand threads at the second end;

vii) positional indicators cast or molded into said flanges, indicating the position of the beginning of the threads on the internally threaded ends of said coupler, said threads beginning at matching points on the internal circumference of the ends of said coupler.

18. A coupler as recited in claim 17, whereby said coupler has directional indicators cast or molded into the barrel, indicating direction of rotation for disconnecting the coupler.

19. An adapter and coupler assembly as recited in claim 15, whereby said second end of said adapters comprises one of the following types: threaded, or smooth.

20. An adapter and coupler assembly as recited in claim 1, whereby said coupler has a positional indicator cast or molded on each flange indicating the position of the beginning of the internal thread at the threaded end nearest to said flange, said threads beginning at matching points on the internal circumference of the ends of said coupler.

21. An adapter and coupler assembly as recited in claim 1, whereby said coupler has directional indicators cast or molded on the body of the coupler indicating the direction in which the coupler must be rotated in order to disconnect it from said adapters.

22. An adapter and coupler assembly as recited in claim 1, whereby said first and second adapters each have a positional indicator cast or molded on the perforated annular flanges, indicating the position of the thread start on the external right-hand and left-hand threads respectively.

23. An adapter and coupler assembly for connecting components of marine and land vehicle water, wastewater, and other plumbing systems, comprising:

a) a coupler having a bore extending longitudinally along its axis for the flow of fluid; internal right-hand threads at the first end; internal left-hand threads at the second end; a annular flange having perforations disposed near each of said first end and said second end, said flanges and perforations being adapted to allow seizing of the assembly components once connected; and positional indicators cast or molded into said flanges, said indicators marking the position of the beginning points of the threads on the internally threaded ends of said coupler;

b) a first adapter having right-hand exterior thread it one end, said treads being adapted to threadedly engage with said right-hand inter or threads of said coupler; an exterior perforated annular flange adjacent to said right-hand exterior threads; and a positional indicator cast or molded on said annular flange, said indicator marking the beginning point of said right-hand exterior threads;

c) a second adapter having left-hand exterior threads at one end, said threads being adapted to threadedly engage wit said left-hand interior threads of said coupler; an exterior perforated annular flange adjacent to said left-hand exterior threads; and a positional indicator cast or molded on said annular flange, said indicator marking the beginning point of said left-hand exterior threads.

24. An adapter and coupler assembly as recited in claim 9, wherein two sealing mechanisms known to the plumbing art, such as sealing rings, washers, or gaskets, are disposed on either side of said internal annular flange to effect a fluid-tight seal with said threaded ends of said adapters.

* * * * *